Feb. 5, 1924.  1,482,735
J. CATSULES
KITCHEN UTENSIL
Filed April 18, 1923
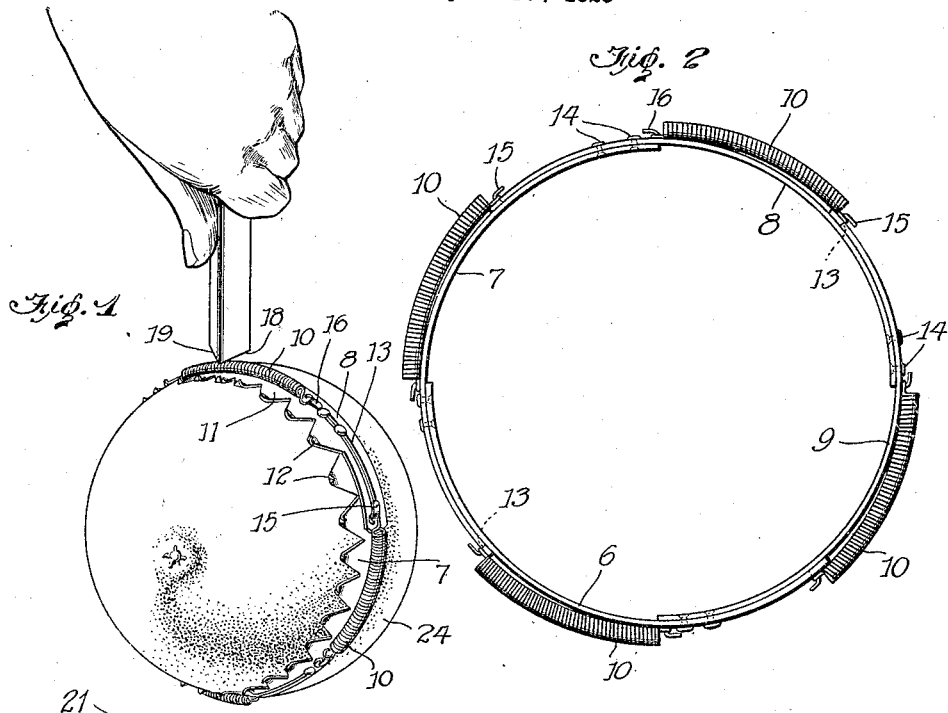
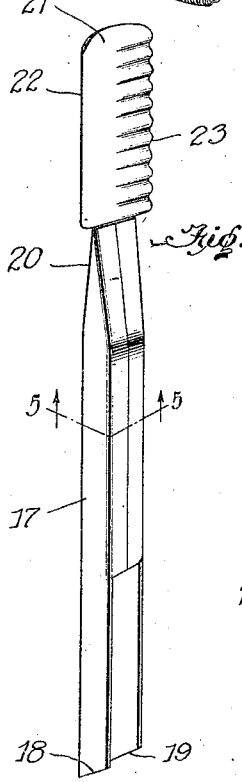
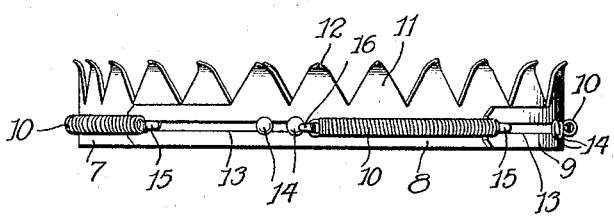
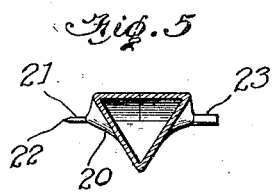
Inventor
James Catsules
By James R. Bowen
Attorney Patented Feb. 5, 1924.

1,482,735

UNITED STATES PATENT OFFICE.

JAMES CATSULES, OF WEST HOBOKEN, NEW JERSEY, ASSIGNOR OF ONE-HALF TO RUDOLF FEISER, OF WEST HOBOKEN, NEW JERSEY.

KITCHEN UTENSIL.

Application filed April 18, 1923. Serial No. 632,910.

*To all whom it may concern:*

Be it known that JAMES CATSULES, a subject of the King of Greece, residing at West Hoboken, in the county of Hudson and State of New Jersey, has invented certain new and useful Improvements in Kitchen Utensils, of which the following is a specification.

The present invention relates to improvements in kitchen utensils and more particularly resides in providing an improved utensil for use in cutting fruit or vegetables in which the article of food is cut with a scalloped edge.

An object of the invention is to provide a utensil particularly useful in connection with grape fruit, oranges and the like fruit which are cut in half and served in this manner, the utensil providing for dividing the fruit and in imparting to the cut edges of each half a scalloped or wave-like formation.

It is another object of the invention to provide an implement having the above purpose which will be adjustable to variations in the size of the fruit or vegetable and in which the various portions of the utensil will locally adapt themselves to irregularities in the surface contour of the food article whereby to guide the cutting knife which is used in connection with the utensil accurately and reliably to effect a clean cut and a consequent neat appearance in the severed halves of the fruit or the like.

The invention aims to provide a scalloped expansible ring in conjunction with a cutting knife having a substantially V-shaped edge to cooperate with the scalloped formation of the ring and the knife further yields cutting surfaces for peeling fruit and cutting off scalloped slices from bananas and the like.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of an article of fruit showing the improved utensil and knife in conjunction therewith.

Figure 2 is an enlarged plan view of the utensil.

Figure 3 is an edge view of the same.

Figure 4 is a perspective view of the knife, and

Figure 5 is a cross section taken on the line 5—5 in Figure 4.

Referring more particularly to the drawings the device is composed of a ring adapted to embrace the fruit or vegetable article and having a scalloped edge. The ring is composed of a number of sections 6, 7, 8 and 9, four such sections being illustrated although a greater or less number may be employed; and the sections are preferably made of some flexible material as light sheet metal which will readily accommodate itself and conform to the surface portion of the skin of the fruit or vegetable to which the device is applied.

The sections of the ring are overlapped at both ends and one section is slidable relatively to the two adjacent and overlapped companion sections so that a wide range of adjustability is yielded due to the local expansion taking place at each end of each of the sections. The sections are held together yieldably by coil springs 10 or other appropriate means and these coil springs lie close to the exterior faces of the sections and they are preferably made up of a large number of closely assembled convolutions to admit of wide stretching. This construction of the spring and the relatively great length of the sections which are overlapped throughout wide areas, provide a ring or guide possessing the characteristic of wide diametric expansion to enable the same to encompass oranges, grape fruit, etc., of widely different sizes.

The ring is formed or carries along one edge a series of substantially triangular prongs 11 which may have out turned tips or apexes 12 useful in guiding the ring on to the fruit. Certain of the prongs may be overlapped as indicated in Figure 3 so that when the ring is drawn out to a great extent the continuity of the scalloped formation may be preserved.

At one end each ring section is provided with an elongated slot 13 extending circumferentially and occupied by a pair of rivets or pins 14 spaced slightly apart and carried by the overlapped end of the adjoining section. The comparative close relation of the pins 14 is such as to avoid materially interfering with the sliding of one section upon another but the spacing of these pins is sufficiently remote to avoid any appreciable rocking of the sections upon the pins in an axial direction. At the ends of the slots 13 are hooks 15 and 16 for receiving the looped ends of the coil springs 10; these hooks being preferably in one piece with the metallic sections and being cut from the ends of the slots and struck outwardly.

The knife used in conjunction with the utensil is illustrated in Figures 4 and 5 and it also consists preferably of some appropriate metal possessing sufficient rigidity to be driven down radially through the fruit and the knife is shown as composed of a triangular shaped handle 17 closed or tubular for its major length and having lower cutting edges 18 and 19 meeting in an apex and forming a substantial V. The edges 18 and 19 are also preferably beveled from the apex, the apex forming the outer most point. This will give a shearing cut and will facilitate the penetration of the knife into the food article. At the other end of the handle, the same is flattened as indicated at 20 and merges into a knife blade 21 having a sharp knife edge 22 at one side useful in peeling fruit or for like purpose and at its other side having a scalloped or corrugated cutting edge 23 for slicing bananas or other fruits or vegetables in which the slices acquire a scalloped shape.

In use the ring is pushed over the grape fruit or other article of food indicated at 24 in Figure 1 and the flaring character of the prongs 11 facilitate the movement of the ring onto the center portion of the grape fruit and the ring is expanded conformably to the size it must encompass.

The V-shaped knife edges 18 and 19 cooperate with the triangular prongs 11, the knife edges or blades sliding along the convergent walls of the prongs. The manner of applying the knife is indicated in Figure 1 in which the knife is held in one hand while the fruit may be steadied with the other while the knife is driven down radially through the fruit.

The fruit is turned at each fresh insertion of the knife and after the knife has completed the circle the fruit will fall in half and it will be seen that a scalloped formation is imparted to the edges thereof. Of course other shape might be imparted by giving the necessary character to the prongs and the knife blade. For instance the outer edges of the prongs 11 may be rounded instead of meeting in a substantial apex and the knife may also be rounded where the blades 18 and 19 meet. The projecting apex portion of the blades 18 and 19 is also useful in removing pits or seeds or to cut out the inside of the piece of fruit.

Both the ring and the knife will preferably be made of steel although other material may be found suitable for the purpose.

It is obvious that various changes and modifications may be made in the details of construction and design of the above specifically described embodiment of this invention without departing from the spirit thereof.

What is claimed is:—

1. A kitchen utensil comprising an expansible ring adapted to fit about an article of food and having a fancy edge, and a knife having an edge conformable with respect to the edge of said ring and adapted to be driven down radially into the fruit guided by the fancy edge of the ring.

2. A kitchen utensil comprising a ring having a scalloped edge and a knife having similarly formed cutting blades cooperating with the scalloped edge of said ring.

3. A kitchen utensil comprising a ring composed of relatively movable sections, said ring having a fancy edge, and a knife having complemental blades for cooperating with the fancy edge of said ring.

4. A kitchen utensil comprising a ring composed of a number of flexible sections adapted to move relatively to one another, means to yieldably hold the sections in a contracted position, said ring having a fancy edge, and a complementally formed knife cooperating with said fancy edge of the ring.

5. A kitchen utensil comprising a ring composed of a number of flat thin metallic sections having slots therein with hooks at the ends of the slots, guide means carried by each section and slidably engaging in the slot of the adjacent section, spring means coupled to the hooks of adjacent sections, said sections having prongs with out-turned edges, and a knife conforming in shape to said prongs.

6. A kitchen utensil comprising a scalloped ring, a knife used in conjunction therewith and having a substantially triangular cross section with blades disposed in substantially V-formation with a protruding apex and backwardly sloping edges, said knife also having a sharp knife edge and a scalloped edge opposite thereto.

7. A kitchen utensil comprising a ring composed of overlapped section of flexible material having scalloped edges, means to guide the sections in their relative sliding movement, and means tending to draw the sections together.

In testimony whereof I affix my signature.

JAMES CATSULES.